United States Patent [19]

Satake et al.

[11] Patent Number: 5,075,146

[45] Date of Patent: Dec. 24, 1991

[54] OPTICAL RECORDING MEDIUM

[75] Inventors: Toshimi Satake; Tomoaki Nagai; Hiroshi Fukui; Akio Sekine, all of Kita, Japan

[73] Assignee: Jujo Paper Co., Ltd., Tokyo, Japan

[21] Appl. No.: 426,221

[22] Filed: Oct. 25, 1989

[30] Foreign Application Priority Data

Oct. 28, 1988 [JP] Japan ................................ 63-272702

[51] Int. Cl.[5] .................................................. B32B 3/02

[52] U.S. Cl. ......................................... 428/64; 428/65; 428/76; 428/913; 369/288; 346/76 L; 346/135.1; 430/945

[58] Field of Search ...................... 428/64, 65, 76, 913; 369/288; 346/76 L, 135.1; 430/945

[56] References Cited

FOREIGN PATENT DOCUMENTS 0366461 5/1990 European Pat. Off. .

*Primary Examiner*—Patrick J. Ryan

*Attorney, Agent, or Firm*—Cushman, Darby & Cushman

[57] ABSTRACT

A novel optical recording medium is here disclosed in which an underlayer and a heat-sensitive color-developing layer are laminated in this order onto a base material, the underlayer containing a near infrared absorbent, the heat-sensitive color-developing layer containing a basic colorless dye and an organic developer. The near infrared absorbent may be a dispersible near infrared absorbent which absorbs a wave length in a near infrared region of 0.7 to 2.5 μm, and this dispersible near infrared absorbent is graphite, copper sulfide, lead sulfide, black titanium or tri-iron tetroxide. A transparent protective layer may be superimposed on the heat-sensitive color-developing layer.

6 Claims, No Drawings

OPTICAL RECORDING MEDIUM

BACKGROUND OF THE INVENTION (1) Field of the Invention

The present invention relates to an optical recording medium on which recording can be made, when irradiated with light having a wave length in a near infrared region.

(2) Description of the Prior Art

A heat-sensitive recording system is a direct recording system which does not require any development and fixing, and therefore it is excellent in operation and maintenance. For this reason, the heat-sensitive recording system is widely utilized in facsimiles, printers and the like.

In this system, however, the recording is thermally made by bringing a thermal head or an exothermic IC pen into direct contact with a heat-sensitive recording paper, and therefore melted colored substances adhere to the thermal head or the exothermic IC pen, so that troubles such as dregs adhesion and sticking take place, which brings about record obstruction and impairs record quality inconveniently.

In particular, when a line is depicted continuously in a recording direction as in the case of a plotter printer, it is impossible to avoid the trouble of the dregs adhesion.

Furthermore, when the recording is made by the thermal head, it is difficult to more heighten an image resolution of 8 dots/mm which is now employed.

Thus, as techniques by which troubles such as the dregs adhesion and the sticking are solved and by which the resolution is more improved, some non-contact recording systems using light have been suggested.

Japanese Patent Laid-open Publication No. 209594/1983 discloses an optical recording medium prepared by laminating at least one set of a near infrared absorbent layer having an absorption wave length in a near infrared region of 0.8 to 2 μm and a heat-sensitive color-developing material layer onto a substrate, and Japanese Patent Laid-open Publication No. 9449/1983 discloses a recording medium prepared by superposing, on a base material, a layer containing one or more kinds of heat-sensitive materials and a layer containing one or more kinds of near infrared absorbents comprising compounds having a maximum absorption wave length in near infrared rays of 0.7 to 3 μm.

These publications disclose the procedure of laminating or superposing the near infrared absorbent and the heat-sensitive color-developing material on the substrate or the base material. That is, the near infrared absorbent is mixed with the heat-sensitive color-developing material and the resulting mixture is then applied onto the substrate or the base material, or alternatively the heat-sensitive color-developing material is first applied on the substrate or the base material, and the near infrared absorbent is then applied on the heat-sensitive color-developing material layer.

Furthermore, in the above-mentioned publications, there are disclosed dyestuffs such as cyanine dyestuffs, thiol nickel complexes and squalilium as the near infrared absorbent having the absorption wave length in a near infrared region of 0.8 to 2 μm or 0.7 to 3 μm.

In addition, as enumerated in "Near Infrared Absorption Dyestuffs", Chemical Industry, Vol. 43, May 1986, other dyestuffs are known which are, for example, nitroso compounds and their metal complexes, polymethine dyestuffs (cyanine dyestuffs), complexes of thiols and cobalt or palladium, phthalocyanine dyestuffs, triallylmethane dyestuffs, immonium dyestuffs, diimmonium dyestuffs and naphthoquinone dyestuffs.

As disclosed in the above-mentioned laid-open publications, the near infrared absorbent and the heat-sensitive color-developing material are applied on the substrate or the base material. That is, these materials are mixed and the resulting mixture is then applied onto the substrate or the base material, or alternatively when the heat-sensitive color-developing material is first applied on the substrate or the base material, and the near infrared absorbent is then applied on this material layer. However, in the above-mentioned mixing step, a desensitization phenomenon occurs, and color development performance declines. Moreover, when the near infrared absorbent is applied onto the material layer, a ground color deteriorates inconveniently. These problems prevent putting the optical recording medium into practical use.

SUMMARY OF THE INVENTION

An object of the present invention is to provide an optical recording medium which is excellent in a ground color and recording characteristics such as color development performance and record retention properties.

The above object can be achieved by superposing an underlayer containing a near infrared absorbent on a base material, and then laminating a heat-sensitive color-developing layer containing a basic colorless dye and an organic developer onto the underlayer.

Furthermore, it has been found that a more excellent optical recording medium can be obtained by employing a dispersible near infrared absorbent as the near infrared absorbent in the underlayer, putting a transparent protective layer on the heat-sensitive color-developing layer, causing a soluble near infrared absorbent to be present in the protective layer, in the underlayer, or on the upper or lower side thereof, and adding a pigment having a high reflectivity of the near infrared rays to the underlayer.

DETAILED DESCRIPTION OF THE INVENTION

The feature of the present invention resides in that an underlayer containing a near infrared absorbent is disposed under a heat-sensitive color-developing layer. The near infrared absorbents used in the present invention can be classified into a dispersible near infrared absorbent which does not dissolve in a solvent and a soluble near infrared absorbent which dissolves in the solvent. The dispersible near infrared absorbent has not been heretofore used because of strong coloring properties and no solubility. When this kind of dispersible near infrared absorbent is incorporated in the underlayer under the heat-sensitive coloring-developing layer containing a basic colorless dye and an organic developer, an excellent optical recording medium can be obtained by the effective utilization of advantageous characteristics which the dispersible near infrared absorbent has inherently. In the thus obtained optical recording medium, uniform and strong absorbance are present all over a wide near infrared region of 0.7 to 2.5 μm, the absorbed near infrared rays can be converted into heat effectively, and these characteristics can be stably kept up for a long period of time.

In general, the heat-sensitive color-developing system comprising the basic colorless dye and the organic developer is sensitive to outside conditions, and so it is desirable that the amount of a material which is not concerned with coloring is controlled as low as possible or that such a material is not added thereto at all, even if the material does not prevent the coloring function. In particular, an acidic material and a basic material cannot in the least be employed, because the former develops a color when reacted with a dye, and the latter has desensitization function. Materials which have the near infrared absorption ability and which can be directly added to the heat-sensitive color-developing layer are very limited.

Therefore, when the near infrared absorbent is contained in the heat-sensitive color-developing layer, the desensitization occurs and the coloring properties are impaired. Furthermore, when the dispersible near infrared absorbent is contained in the heat-sensitive color-developing layer, the ground color of the heat-sensitive layer is inversely affected by coloring. Therefore, in the case that the near infrared absorbent is directly contained in the heat-sensitive color-developing layer, any practical optical recording mediums cannot be obtained.

The dispersible near infrared absorbent used in the present invention should have characteristics capable of substantially uniformly and strongly absorbing near infrared rays of 0.7 to 2.5 μm and capable of converting the absorbed infrared rays into heat. Typical examples of the dispersible near infrared absorbent include artificial graphite, natural graphites such as fibroblastic graphite, scaly graphite and mud-like graphite, copper sulfide, lead sulfide, molybdenum trisulfide and black titanium. These absorbents are desirably used in the form of fine particles preferably having an average particle diameter of 3 μm or less. The fine particles may be obtained by mechanically grinding down the absorbent by friction under wet or dry conditions, dissolving/depositing the absorbent in a colloidal state in a liquid such as an aqueous solution, or utilizing a chemical reaction.

The dispersible near infrared absorbent is preferably used in the smallest possible amount from viewpoints of coloring properties and economy. However, when its amount is too small, the absorption of near infrared rays of 1 μm or less tends to weak, because the absorption of near infrared rays of 1 μm or less by the dispersible near infrared absorbent is relatively weak, though this kind of absorbent can absorb the rays all over the near infrared region of 0.7 to 2.5 μm.

On the other hand, with regard to the soluble near infrared absorbents, their absorption peaks arc present at about 1 μm or less in most cases. Therefore, when the dispersible near infrared absorbent and the soluble near infrared absorbent are used together, and when amounts of these kinds of absorbents are suitably adjusted, the functionally balanced underlayer can be formed which can uniformly absorb the near infrared rays in a wide region.

In many cases, the underlayer of the present invention is composed of a white filler, the near infrared absorbent and a binder, and the ratio of the near infrared absorbent to be added is desirably 5% by weight or less to the solid content of the underlayer, a ratio of 0.25 to 1.5% by weight being optimum.

The simultaneous employment of the dispersible near infrared absorbent and the soluble near infrared absorbent permits minimizing the amount of the near infrared absorbents to be added. In this case, an optimum blend ratio between both the absorbents depends upon the wave length and energy of the near infrared rays from a light source and the balance of a ground color.

The soluble near infrared absorbent used in the present invention is what can be dissolved relatively easily in water and a solvent such as an alcohol and toluene, and its solubility is preferably 5% or more.

Examples of the soluble near infrared absorbent include the following compounds, but they are not restrictive.

1. Polymethine Dyestuffs (cyanine dyestuffs)

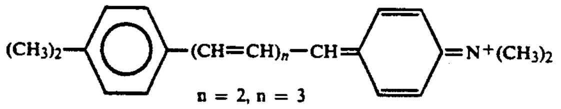

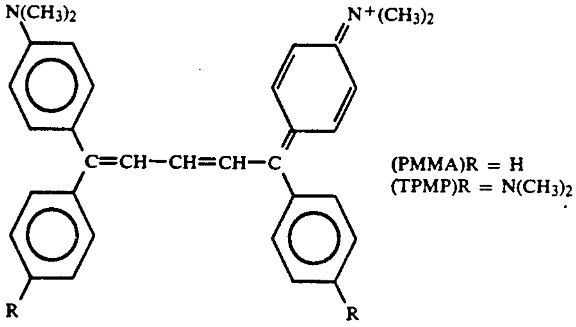

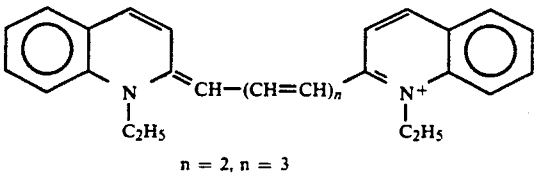

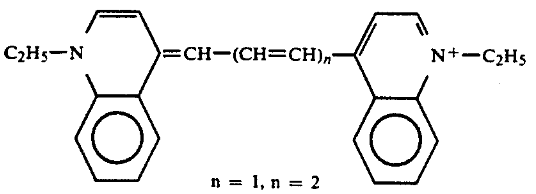

-continued
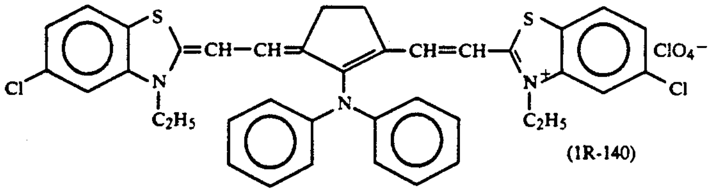
(IR-140)
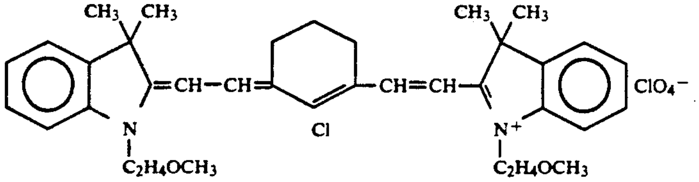
2. Azulenium Dyestuff
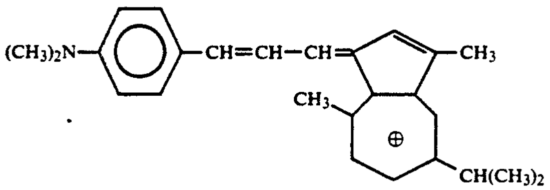
3. Pyrylium, Thiopyrylium Dyestuff
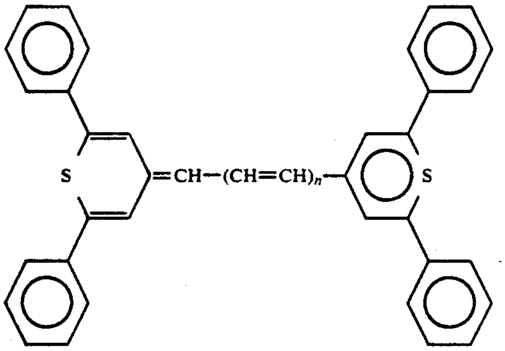
4. Squalilium Dyestuff
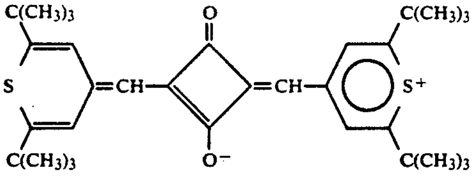
5. Croconium Dyestuff
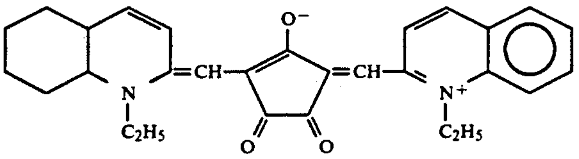
6. Thiol Nickel Complex Salt Chlorine Dyestuffs
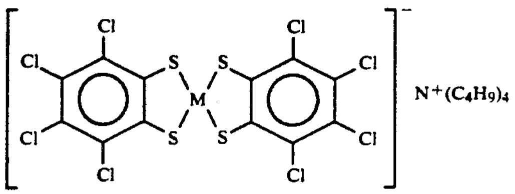
M = Ni
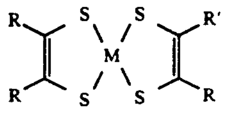
M = Ni, R = $C_3H_7$ -continued
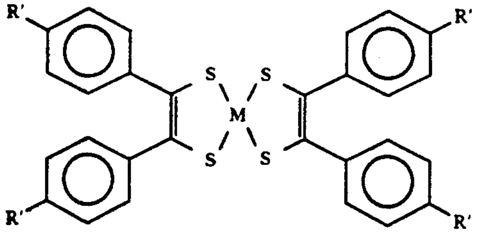
M = Ni R' = H
M = Ni R' = $OCH_3$
M = Pt R' = H
7. Mercaptophenol, Mercaptonaphthol Complex Dyesuffs
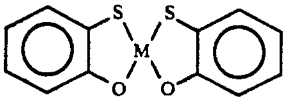
M = Ni, Co
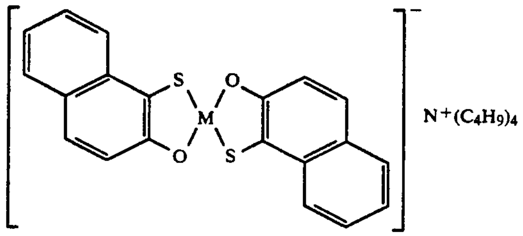
M = Ni, Co, Pt
8. Triallylmethane Dyestuffs
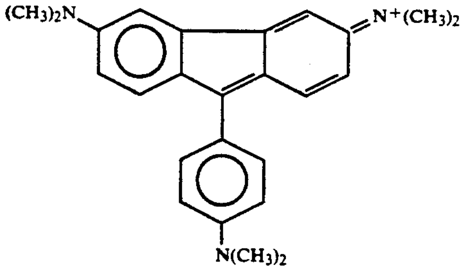
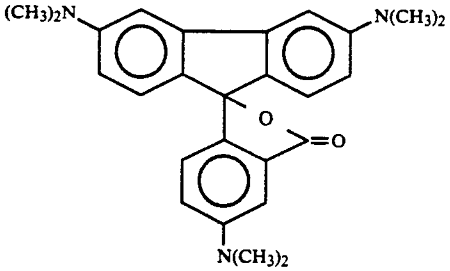
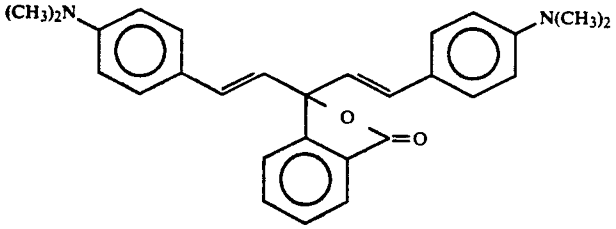
9. Immonium, Diimmonium Dyestuffs
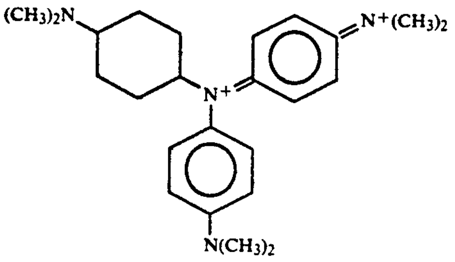
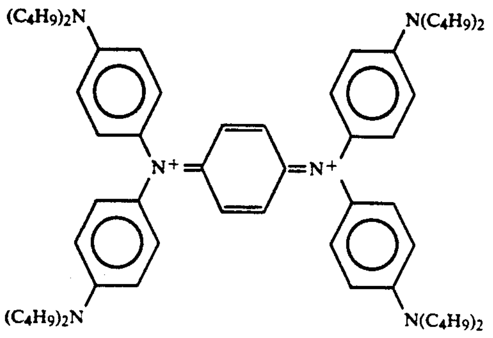
10. Anthraquinone Dyestuffs -continued
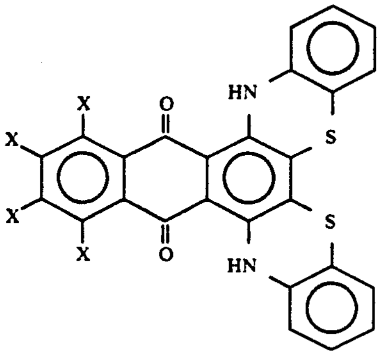
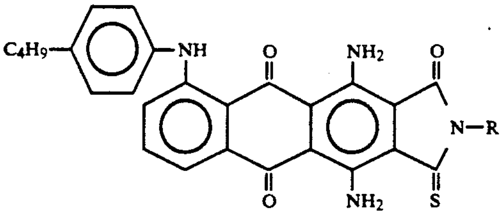
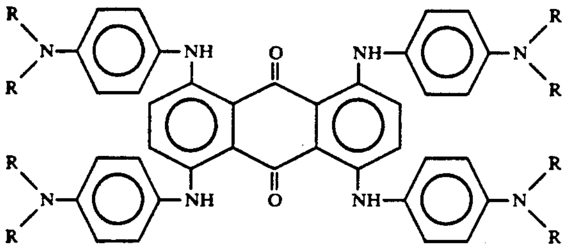
11. Metal Complex Salt Dyestuffs
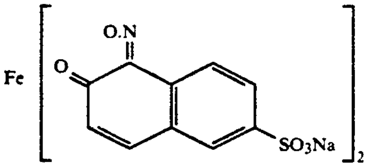
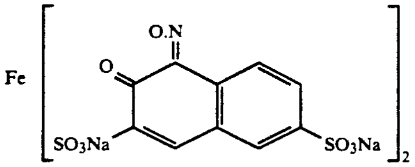
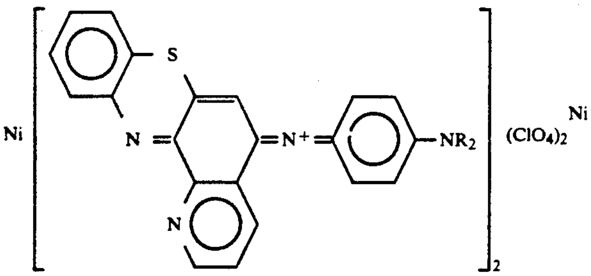
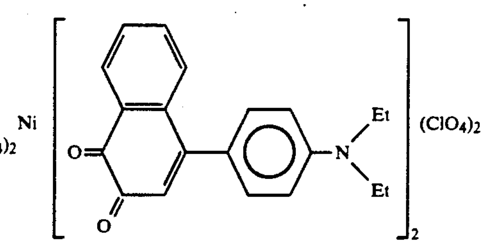
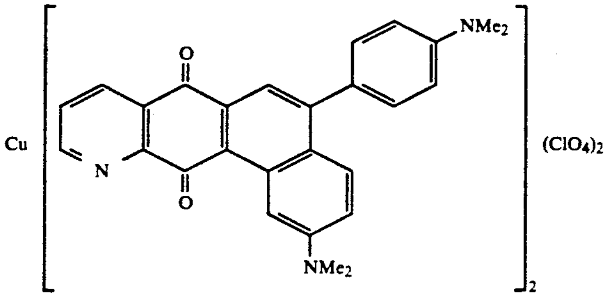

-continued

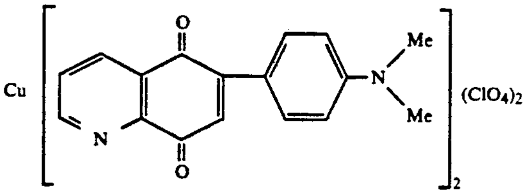

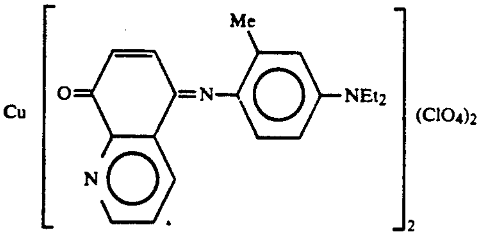

In addition, near infrared absorbents manufactured by ICI Ltd., for example, S101756, S116510, S116510/2, S109186, S109564 and S109564/2 can also be used. Above all, S116510, S109564, Naphthol Green dyestuffs and nitroso dyestuffs which are soluble in water and S116510/2 which is soluble in an alcohol can be applied in a wide coating operation range, and what is better, they can be easily used.

The dispersible near infrared absorbent or the mixture of the dispersible near infrared absorbent and the soluble near infrared absorbent is applied on a base material in order to become the underlayer thereon. Raw materials which can be used as the base material are not limited at all, but typical examples thereof include papers, synthetic papers and plastic films.

A white pigment used in the present invention, when dispersible near infrared absorbent is used, conceals the color of this absorbent to effectively whiten the whole optical recording medium. In addition, the white pigment also has the function to scatter the incident near infrared rays in surroundings so as to increase the probability that the scattered near infrared rays are struck on the near infrared absorbent, which leads to the increase in heat generation efficiency.

Usually, the white pigment reflects visible rays strongly, but it similarly reflects the near infrared rays, too. Examples of the usable white pigment include clay, heavy calcium carbonate, sedimentary calcium carbonate, titanium oxide, calcium sulfate, barium sulfate, zinc sulfate, satin white, talc, basic magnesium carbonate, zinc oxide, alumina, white carbon, silica gel, colloidal silica and plastic pigments. Above all, preferable are silica gel, colloidal silica, superfine alumina, plastic pigments which are porous or have a great specific surface area In particular, hollow plastic pigments are preferable. Because they are excellent in the absorbency of the near infrared rays and heat insulating properties, with the result that they prevent the heat of the near infrared rays absorbed by the near infrared absorbent from diffusing.

The dispersible near infrared absorbent, the soluble near infrared absorbent and the white pigment are applied in the form of a coating material onto the base material together with a binder. The binder is one or a mixture of two or more selected from those which are used in coating the heat-sensitive color-developing layer.

Onto the thus prepared underlayer, the heat-sensitive recording layer is laminated which comprises a basic colorless dye, an organic developer, a binder and, if necessary, a sensitizer and a quality regulator such as a filler.

The basic colorless dyes are not particularly limited, but their preferable examples are triphenylmethane dyes, fluoran dyes, azaphthalide dyes and fluorene dyes.

Typical examples of the basic colorless dyes are as follows:

Triphenylmethane Leuco Dye 3,3-bis(p-dimethylaminophenyl)-6-dimethylamino phthalide
(another name: Crystal Violet Lactone)

Fluoran Leuco Dyes 3-diethylamino-6-methyl-7-anilinofluoran
3-(N-ethyl-p-toluidino)-6-methyl-7-anilinofluoran
3-(N-ethyl-N-isoamylamino)-6-methyl-7-anilinofluoran
3-diethylamino-6-methyl-7-(o,p-dimethylanilino)fluoran
3-pyrrolidino-6-methyl-7-anilinofluoran
3-piperidino-6-methyl-7-anilinofluoran
3-(N-cyclohexyl-N-melthylamino)-6-methyl-7-anilinofluoran
3-diethylamino-7-(m-trifluoromethylanilino)fluoran
3-N-n-dibutylamino-7-(o-chloroanilino)fluoran
3-(N-ethyl-N-tetrahydrofurfurylamino)-6 methyl-7 -anilinofluoran
3-dibutylamino-6-methyl-7-(o,p-dimethylanilino)fluoran
3-(N-methyl-N-propylamino)-6-methyl-7-anilinofluoran
3-diethylamino-6-chloro-7-anilinofluoran
3-dibutylamino-7-(o-chloroanilino)fluoran
3-diethylamino-7-(o-chloroanilino)fluoran
3-diethylamino-6-methyl-chlorofluoran
3-diethylamino-6-methyl-fluoran
3-cyclohexylamino-6-chlorofluoran
3-diethylamino-benzo[a]-fluoran Azaphthalide Leuco Dyes 3-(4-diethylamino-2-ethoxyphenyl)-3-(1-ethyl-2-methyl-indolo-3-yl)-4-azaphthalide
3-(4-diethylamino-2-ethoxyphenyl)-3-(1-ethyl-2-methyl-indole-3-yl)-7-azaphthalide
3-(4-diethylamino-2-ethoxyphenyl)-3-(1-octyl-2-methyl-indole-3-yl)-4-azaphthalide
3-(4-N-cyclohexyl-N-methylamino-2-methoxyphenyl)-3-(1-ethyl-2-methylindole-3-yl)-4-azaphthalide Fluorhein Leuco Dyes 3,6,6'-tris(dimethylamino)spiro[fluorhein-9,3'-phthalide]
3,6,6'-tris(diethylamino)spiro[fluorhein-9,3'-phthalide]

These dyes may be used singly or in a mixture of two or more thereof.

Furthermore, examples of the organic developer include bisphenol A's, 4-hydroxybenzoic acid esters, 4-hydroxy-phthalic acid diesters, phthalic acid monoesters, bis(hydroxyphenyl)sulfides, 4-hydroxyphenylarylsulfones, 4-hydroxyphenylaryl sulfonates, 1,3-di[2-(hydroxyphenyl)-2-propyl]-benzenes, 4-hydroxybenzoyloxybenzoic acid esters and bisphenolsulfones. Typical examples of these organic developers are as follows:

Bisphenol A's 4,4'-isopropylidenediphenol
(another name: bisphenol A)
4,4'-cyclohexylidenediphenol
p,p'-(1-methyl-n-hexylidene)diphenol

4-Hydroxybenzoic Acid Esters 4-hydroxybenzoic acid benzyl
4-hydroxybenzoic acid ethyl
4-hydroxybenzoic acid propyl
4-hydroxybenzoic acid isopropyl
4-hydroxybenzoic acid butyl
4-hydroxybenzoic acid isobutyl
4-hydroxybenzoic acid methylbenzyl

4-Hydroxyphthalic Acid Diesters 4-hydroxyphthalic acid dimethyl
4-hydroxyphthalic acid diisopropyl
4-hydroxyphthalic acid dibenzyl
4-hydroxyphthalic acid dihexyl

Phthalic Acid Monoesters phthalic acid monobenzyl ester
phthalic acid monocyclohexyl ester
phthalic acid monophenyl ester
phthalic acid monomethylphenyl ester
phthalic acid monoethylphenyl ester
phthalic acid monoalkylbenzyl ester
phthalic acid monohalogenbenzyl ester
phthalic acid monoalkoxybenzyl ester

Bis-(Hydroxyphenyl) Sulfides bis-(4-hydroxy-3-tert-butyl-6-methylphenyl) sulfide
bis-(4-hydroxy-2,5 dimethylphenyl) sulfide
bis-(4-hydroxy-2-methyl-5-ethylphenyl) sulfide
bis-(4-hydroxy-2-methyl-5-isopropylphenyl) sulfide
bis-(4-hydroxy-2,3-dimethylphenyl) sulfide
bis-(4-hydroxy-2,5-diethylphenyl) sulfide
bis-(4-hydroxy-2,5-diisopropylphenyl) sulfide
bis-(4-hydroxy-2,3,6-trimethylphenyl) sulfide
bis-(2,4,5-trihydroxyphenyl) sulfide
bis-(4-hydroxy-2-cyclohexyl-5-methylphenyl) sulfide
bis-(2,3,4-trihydroxyphenyl) sulfide
bis-(4,5-dihydroxy-2-tert-butyl-phenyl) sulfide
bis-(4-hydroxy-2,5-diphenylphenyl) sulfide
bis-(4-hydroxy-2-tert-octyl-5-methylphenyl) sulfide

4-Hydroxyphenylarylsulfones 4-hydroxy-4'-isopropoxydiphenylsulfone
4-hydroxy-4'-methyldiphenylsulfone
4-hydroxy-4'-n-butyloxydiphenylsulfone

Hydroxyphenylaryl sulfonates 4-hydroxyphenylbenzene sulfonate
4-hydroxyphenyl-p-tolyl sulfonate
4-hydroxyphenylmethylene sulfonate
4-hydroxyphenyl-p-chlorobenzene sulfonate
4-hydroxyphenyl-p-tert-butylbenzene sulfonate
4-hydroxyphenyl-p-isopropoxybenzene sulfonate
4-hydroxyphenyl-1'-naphthalene sulfonate
4-hydroxyphenyl-2'-naphthalene sulfonate

1,3-Di[2-(hydroxyphenyl)-2-propyl]benzenes 1,3-di[2-(4-hydroxyhenyl)-2-propyl]benzene
1,3-di[2-(4-hydroxy-3-alkylphenyl)-2-propyl]benzene
1,3-di[2-(2,4-dihydroxyphenyl)-2-propyl]benzene
1,3-di[2-(2-hydroxy-5-methylphenyl)-2-propyl]benzene

Resorcinol 1,3-dihydroxy-6(α,α-dimethylbenzyl)-benzene

4-Hydroxybenzoyloxybenzoic Acid Esters 4-hydroxybenzoyloxybenzoic acid benzyl
4-hydroxybenzoyloxybenzoic acid methyl
4-hydroxybenzoyloxybenzoic acid ethyl
4-hydroxybenzoyloxybenzoic acid propyl
4-hydroxybenzoyloxybenzoic acid butyl
4-hydroxybenzoyloxybenzoic acid isopropyl
4-hydroxybenzoyloxybenzoic acid tert-butyl
4-hydroxybenzoyloxybenzoic acid hexyl
4-hydroxybenzoyloxybenzoic acid octyl
4-hydroxybenzoyloxybenzoic acid nonyl
4-hydroxybenzoyloxybenzoic acid cyclohexyl
4-hydroxybenzoyloxybenzoic acid β-phenethyl
4-hydroxybenzoyloxybenzoic acid phenyl
4-hydroxybenzoyloxybenzoic acid α-naphthyl
4-hydroxybenzoyloxybenzoic acid β-naphthyl
4-hydroxybenzoyloxybenzoic acid sec-butyl

Bisphenolsulfones (I)

bis-(3-1-butyl-4-hydroxy-6-methylphenyl)sulfone
bis-(3-ethyl-4-hydroxyphenyl)sulfone
bis-(3-propyl-4-hydroxyphenyl)sulfone
bis-(3-methyl-4-hydroxyphenyl)sulfone
bis-(2-isopropyl-4-hydroxyphenyl)sulfone
bis-(2-ethyl-4-hydroxyphenyl)sulfone
bis-(3-chloro-4-hydroxyphenyl)sulfone
bis-(2,3-dimethyl-4-hydroxyphenyl)sulfone
bis-(2,5-dimethyl-4-hydroxyphenyl)sulfone
bis-(3-methoxy-4-hydroxyphenyl)sulfone
4-hydroxyphenyl-2'-ethyl-4'-hydroxyphenylsulfone
4-hydroxyphenyl-2'-isopropyl-4'-hydroxyphenylsulfone
4-hydroxyphenyl-3'-isopropyl-4'-hydroxyphenylsulfone
4-hydroxyphenyl-3'-sec-butyl-4'-hydroxyphenylsulfone
3-chloro-4-hydroxyphenyl-3'-isopropyl-4'-hydroxyphenylsulfone
2-hydroxy-5-t-butylphenyl-4'-hydroxyphenylsulfone
2-hydroxy-5-t-aminophenyl-4'-hydroxyphenylsulfone
2-hydroxy-5-isopropylphenyl-4'-hydroxyphenylsulfone
2-hydroxy-5-t-octylphenyl-4'-hydroxyphenylsulfone
2-hydroxy-5-t-butylphenyl-3'-chloro-4'-hydroxyphenyl-sulfone
2-hydroxy-5-t-butylphenyl-3'-methyl-4'-hydroxyphenyl-sulfone
2-hydroxy-5-t-butylphenyl-3'-isopropyl-4'-hydroxyphenyl-sulfone
2-hydroxy-5-t-butylphenyl-3'-chloro-4'-hydroxyphenyl-sulfone
2-hydroxy-5-t-butylphenyl-3'-methyl-4'-hydroxyphenyl-sulfone
2-hydroxy-5-t-butylphenyl-3'-isopropyl-4'-hydroxyphenylsulfone
2-hydroxy-5-t-butylphenyl-2'-methyl-4'-hydroxyphenyl-sulfone

Bisphenolsulfones (II)

4,4'-sulfonyldiphenol
2,4'-sulfonyldiphenol
3,3'-dichloro-4,4'-sulfonyldiphenol
3,3'-dibromo-4,4'-sulfonyldiphenol 3,3'5,5'-tetrabromo-4,4'-sulfonyldiphenol
3,3'-diamino-4,4'-sulfonyldiphenol Others p-tert-butylphenol
2,4-dihydroxybenzophenone
novolak type phenolic resin
4-hydroxyacetophenone
p-phenylphenol
benzyl-4-hydroxyphenyl acetate
p-benzylphenol These developers can be used singly or as a mixture of two or more thereof.

Examples of the binder used in the present invention include completely saponified polyvinyl alcohol having a polymerization degree of 200 to 1,900, partially saponified polyvinyl alcohol, carboxy-modified polyvinyl alcohol, amide-modified polyvinyl alcohol, sulfonic acid-modified polyvinyl alcohol, butyral-modified polyvinyl alcohol, other modified polyvinyl alcohol, hydroxyethyl cellulose, methyl cellulose, carboxymethyl cellulose, styrene-maleic anhydride copolymer, styrene-butadiene copolymer, cellulose derivatives such as ethyl cellulose and acetyl cellulose, polyvinyl chloride, polyvinyl acetate, polyacrylamide, polyacrylic acid esters, polyvinyl butyral, polystyrol and copolymers thereof, polyamide resin, silicon resin, petroleum resin, terpene resin, ketone resin and coumarone resin. These high polymers, when used, are dissolved in water or a solvent such as an alcohol, a ketone, an ester or a hydrocarbon, or alternatively they may be used in an emulsion or paste state in water or a solvent. If desired, these treatments may be used together.

In the present invention, all the inorganic and organic fillers which are used in a usual papar making field can be used. Examples of the usable fillers include clay, talc, silica, magnesium carbonate, alumina, aluminum hydroxide, magnesium hydroxide, barium sulfate, kaolin, titanium oxide, zinc oxide, calcium carbonate, aluminum oxide, urea-form-aldehyde resin, polystyrene and phenolic resin. They can be used in the form of fine particles.

Examples of the sensitizer used in the present invention include fatty acid amides such as stearic acid amide and palmitic acid amide, ethylene bisamide, montan wax, polyethylene wax, terephthalic acid dibenzyl, p-benzyloxybenzoic acid benzyl, di-p-tolyl carbonate, p-benzylbiphenyl, phenyl-α-naphthyl carbonate, 1,4-diethoxynaphthalene, 1-hydroxy-2-naphthoic acid phenyl ester and 1,2-di(3-methylphenoxy)ethylene.

Examples of other quality regulators include a sticking inhibitor such as a metallic salt of a fatty acid; a pressure color development inhibitor such as a fatty acid amide, ethylene bisamide, montan wax or polyethylene wax; a dispersant such as sodium dioctylsulfosuccinate, sodium dodecylbenzenesulfonate, sodium laurate, a sodium salt of laurylalcohol sulfuric acid ester or an alginate; an ultraviolet absorbing agent such as a benzophenone or a triazole; and a known anti-foaming agent, fluorescent brightening agent and hydration inhibitor which can be used in heat-sensitive recording papers.

Kinds and amounts of the organic developer, the basic colorless dye, the binder, the sensitizer, the filler and the other various components in the color-developing layer used in the present invention depend upon a required performance and recording suitability, and therefore they are not particularly limited. However, the suitable amounts of these materials are usually as follows: On the basis of 1 part (in what follows, parts mean parts by weight of a solid content) of the basic colorless dye, the amount of the organic developer is from 3 to 12 parts, that of the sensitizer is from 3 to 12 parts, that of the filler is from 1 to 20 parts, and that of the binder is from 10 to 25 parts in the total solid content of the color-developing layer.

The organic developer, the basic colorless dye and the sensitizer are finely ground separately or, if nothing interferes, together with the materials to be added by the use of a grinder such as a ball mill, an attritor or a sand grinder, or by a suitable emulsifying device in order to obtain particles having a particle diameter of several microns or less. Afterward, the binder and the above-mentioned various necessary quality regulators are further added thereto to prepare a coating solution.

The thus prepared coating solution is applied, as the heat-sensitive recording layer, onto the underlayer, thereby obtaining an optical recording medium.

When the heat-sensitive color-developing layer is laminated onto the underlayer, the colored underlayer is concealed, with the result that the obtained optical recording medium exhibits a suitable appearance.

It is preferred that the protective layer is disposed on the surface of the heat-sensitive color-developing layer so as to reduce or prevent contamination by outside circumstances such as moisture, gases, water, solvents and oily substances.

The protective layer should be transparent to visible light and should not inversely affect the heat-sensitive color-developing layer, and therefore the protective layer may be formed by applying one or more selected out of the binders which can be usually used in the heat-sensitive color-developing layer. If the soluble near infrared absorbent is caused to be present in this protective layer or between the protective layer and the heat-sensitive color-developing layer, the sensitivity of the optical recording medium further increases.

A light source required in an optical recording step is what can emit light containing a wave length of 0.7 to 2.5 μm in a near infrared region, and examples of the usable light source include a semiconductor laser, a diode pumping YAG laser, a Xe flashlamp, a quartz flashlamp and a halogen lamp. A suitable one can be selected out of these light sources in compliance with its use purpose.

As described above, the underlayer containing the near infrared absorbent is disposed between the base material and the heat-sensitive color-developing layer, and therefore the upper layer, i.e., the heat-sensitive color-developing layer develops a color clearly by the irradiation of the near infrared rays. The mechanism of this clear color development is not elucidated but can be presumed to be as follows: The near infrared rays irradiated through an original image pass through the heat-sensitive color-developing layer and are then reflected by the filler particles in the underlayer, and the reflected rays effectively reach the near infrared absorbent. The thus reached near infrared rays are converted into heat with high efficiency in accordance with characteristics of the near infrared absorbent, and this heat is transmitted to the upper color-developing layer extremely effectively, since the heat is shielded by the ambient filler particles and the upper color-developing layer.

Furthermore, the near infrared absorbent is separated from the heat-sensitive color-developing layer, and therefore the desensitization of the color-developing layer does not occur and a ground color does not deteriorate, either.

Now, the present invention will be described in detail In the examples, parts are based on weight.

Examples 1 to 18

Underlayer

A solution (A) was prepared in accordance with the following composition. In this case, a dispersible near infrared absorbent shown in Table 1 was wet-ground down by friction by an attritor until an average particle diameter had reached about 3 μm.

| Solution (A): Dispersible near infrared absorbent slurry | |
|---|---|
| Dispersible near infrared absorbent shown in Table 1 | 20 parts |
| 10% Aqueous polyvinyl alcohol solution | 50 parts |
| Water | 30 parts |
| Total | 100 parts |

Solutions (B) and (C) were each prepared in accordance with the following composition In each case, the soluble near infrared absorbent or the filler was dissolved or dispersed in a solution, respectively.

| Solution (B): Soluble near infrared absorbent solution | |
|---|---|
| Soluble near infrared absorbent shown in Table 1 | 10 parts |
| Water | 90 parts |
| Total | 100 parts |
| Solution (C): Filler slurry | |
| Filler shown in Table 1 | 40 parts |
| Water | 60 parts |
| Total | 100 parts |

With regard to the coating solution composition of an underlayer, in the case that the dispersible near infrared absorbent was used singly, 100 parts of a 10% aqueous polyvinylalcohol solution was added to 250 parts of the solution (C), and the solution (A) was then added thereto so that a ratio of the dispersible near infrared absorbent to the solid content of the total underlayer might be as set forth in Table 1.

In the case that the dispersible near infrared absorbent and the soluble near infrared absorbent were used together, the solution (A) and the solution (B) were added to 250 parts of the solution (C) so that a ratio of the solutions (A) and (B) to the solution (C) might be as set forth in Table 1.

Afterward, the coating solution for the underlayer was applied onto a fine paper having a basis weight of 60 g/m$^2$ by the use of a meyer bar so that coating weight might be 5 g/m$^2$, followed by drying, in order to obtain an undersheet for heat exchange.

Color-developing Layer

| Solution (D): Dye dispersion | |
|---|---|
| 3-Diethylamino-6-methyl-7-anilinofluoran | 2.0 parts |
| 10% Aqueous polyvinyl alcohol solution | 3.4 parts |
| Water | 1.9 parts |
| Total | 7.3 parts |
| Solution (E): Developer dispersion | |
| Bisphenol A | 6.0 parts |
| p-Benzylbiphenyl | 4.0 parts |
| 10% Aqueous polyvinyl alcohol solution | 12.5 parts |
| Water | 2.5 parts |
| Total | 25.0 parts |

Solutions (D) and (E) were prepared in accordance with the above-mentioned blend ratio by wet-grinding down materials by friction with a sand grinder for tests for 1 hour.

Next, a coating solution for a heat-sensitive color-developing layer was prepared by mixing 6.67 parts of the solution (D) (the dye dispersion), 25 parts of the solution (E) (the developer dispersion), 42.5% of a hollow pigment (trade name Lowpeik OP-48J; made by Rohm & Haas Co.) and 11.76 parts of a dispersion.

This coating solution was then applied onto the undersheet for heat exchange by the use of a meyer bar so that coating weight might be 3.0 g/m$^2$, followed by drying, in order to obtain an optical recording paper.

Protective Layer

| | |
|---|---|
| 10% Aqueous polyvinyl alcohol solution | 100 parts |
| Glyoxal (40%) | 5 parts |
| Total | 105 parts |

A coating solution for a protective layer in the above-mentioned blend ratio was applied onto the above obtained optical recording paper by a meyer bar so that coating weight might be 2.0 g/m$^2$, followed by drying, in order to prepare an optical recording paper having the protective layer.

Comparative Examples 1 to 3

With 250 parts of the solution (C) used in Examples 1 to 18 was mixed 100 parts of a 10% aqueous polyvinyl alcohol solution in order to prepare a coating solution for an underlayer. This coating solution for the underlayer was then applied onto a fine paper having a basis weight of 60 g/m$^2$ by the use of a meyer bar so that coating weight might be 5 g/m$^2$, followed by drying, in order to obtain an undersheet for each comparative example which did not contain any near infrared absorbent. Next, the heat-sensitive color-developing coating solution having the same composition as in Examples 1 to 18 was applied onto the above obtained undersheet of each comparative example by the use of the meyer bar so that coating weight might be 3.0 g/m$^2$, followed by drying, in order to obtain a recording paper of each comparative example.

Comparative Examples 4 to 6

In Comparative Example 4, the solution (B) was added to a heat-sensitive color-developing coating solution so that a ratio of a soluble near infrared absorbent to the solid content of a heat-sensitive color-developing layer might be as set forth in Table 1, and the resulting coating mixture was then applied onto the same undersheet as in Comparative Examples 1 to 3 by the use of a meyer bar so that coating weight might be 3.0 g/m$^2$.

In Comparative Example 5, the solution (B) was added to a coating solution for a protective layer so that a ratio of a soluble near infrared absorbent to the solid content of a protective layer might be as set forth in Table 1, and the resulting coating mixture was then applied onto the recording paper of Comparative Example 1 by the use of a meyer bar so that coating weight might be 2.0 g/mhu, followed by drying, in order to obtain an optical recording paper.

In Comparative Example 6, the solution (A) was added to a heat-sensitive color-developing coating solution so that a ratio of a dispersible near infrared absorbent to the solid content of a heat-sensitive color-developing layer might be as set forth in Table 1, and the resulting coating mixture was then applied onto the undersheet obtained in Comparative Example 1 by the use of a meyer bar so that coating weight might be 3.0 $g/m^2$, followed by drying, in order to obtain an optical recording paper of Comparative Example 6.

Each color-developing layer surface of the above prepared optical recording papers in Examples 1 to 18 and Comparative Examples 1 to 6 was irradiated with light from a strobo flash (trade name Auto 4330; made by Sunbag Co., Ltd.) for cameras under conditions that the aperture of a light emission window was adjusted to 5%, in order to obtain an optical record image on the paper.

The evaluation of the optical recording paper was made by measuring the density of the optical record image and a ground color. The measurements of the color density and the ground color were carried out as follows, and the results are set forth in Table 1.

Color density: The density of each image portion was measured by the use of a Macbeth densitometer.

Ground color: The white portion on the optical recording paper was measured by the use of the Macbeth densitometer.

TABLE 1

| | Protective Layer | Filler of Underlayer | Total Amount of Near Infrared Absorbent Added (%) | Underlayer: Dispersible Near Infrared Absorbent | Underlayer: Soluble Near Infrared Absorbent | Blend Ratio of Absorbent (solid) | Color Density | Ground Color |
|---|---|---|---|---|---|---|---|---|
| Example | | | | | | | | |
| 1 | absent | calcined clay | 1.5 | artificial graphite | — | 100:0 | 1.20 | 0.18 |
| 2 | " | hollow pigment | 1.5 | " | — | 100:0 | 1.22 | 0.16 |
| 3 | " | " | 1.5 | " | Naphthol Green B | 90:10 | 1.30 | 0.16 |
| 4 | " | " | 1.5 | " | Naphthol Green B | 50:50 | 1.36 | 0.15 |
| 5 | " | " | 1.5 | " | Naphthol Green B | 10:90 | 1.31 | 0.14 |
| 6 | " | " | 1.5 | copper sulfide | — | 100:0 | 1.21 | 0.16 |
| 7 | " | " | 1.5 | lead sulfide | — | 100:0 | 1.20 | 0.16 |
| 8 | " | " | 1.5 | black titanium | — | 100:0 | 1.20 | 0.16 |
| 9 | " | " | 1.5 | molybdenum trisulfide | — | 100:0 | 1.20 | 0.17 |
| 10 | " | " | 1.5 | mud-like graphite | — | 100:0 | 1.21 | 0.16 |
| 11 | " | " | 1.5 | copper sulfide | Naphthol Green B | 50:50 | 1.36 | 0.15 |
| 12 | present | " | 1.5 | artificial graphite | ICI-S116510 | 50:50 | 1.36 | 0.14 |
| 13 | absent | " | 1.5 | copper sulfide | Naphthol Green B | 50:50 | 1.34 | 0.16 |
| 14 | " | " | 1.5 | — | ICI-S116510 | 0:100 | 1.20 | 0.14 |
| 15 | " | silica | 4.5 | artificial graphite | — | 100:0 | 1.30 | 0.28 |
| 16 | " | silica | 0.5 | " | — | 100:0 | 0.79 | 0.08 |
| 17 | present | hollow pigment | 1.0 | " | Naphthol Green B | 50:50 | 1.30 | 0.13 |
| 18 | " | " | •1.0 (Underlayer + Protective Layer | " | •Naphthol Green B (Protective Layer) | 50:50 | 1.32 | 0.14 |
| Comparative Example | | | | | | | | |
| 1 | absent | hollow pigment | — | — | — | — | 0 | 0.07 |
| 2 | " | " | — | — | — | — | 0 | 0.07 |
| 3 | " | silica | — | — | — | — | 0 | 0.07 |
| 4 | " | hollow pigment | •1.5 (Color-developing Layer) | — | •Naphthol Green B (Color-developing Layer) | 0:100 (Color developing Layer) | 0.53 | 0.37 |
| 5 | present | " | •1.5 (Protective Layer) | — | •Naphthol Green B (Protective Layer) | 0:100 (Protective Layer) | 0.53 | 0.40 |
| 6 | absent | silica | •1.5 (Color-developing Layer) | •artificial graphite (Color-developing Layer) | — | 100:0 (Color developing Layer) | 0.53 | 0.38 |

The results in Table 1 indicate that with regard to the optical recording papers of the comparative examples in which the dispersible near infrared absorbent or the soluble near infrared absorbent is contained only in the heat-sensitive color-developing layer or the protective layer, the color is developed merely slightly and the ground color is dense, whereas with regard to the optical recording papers of the examples in which the dispersible near infrared absorbent, the soluble near infrared absorbent or both of these absorbents are contained in the underlayer, the high image density and the faint ground color are observed. Therefore, it is fair to say that the optical recording papers of the examples are practical.

Furthermore, with regard to the optical recording papers in which the protective layer is provided on the heat-sensitive color-developing layer, their color density of the images and ground color are equal to those of the optical recording papers in which any protective layers are not present. In addition, in the case of each optical recording paper having the protective layer, the recording layer is not peeled off at all, even when the surface of the optical recording layer is rubbed with a wet finger, which means that the optical recording paper having the protective layer is excellent in water resistance and abrasion resistance.

As described above, the optical recording medium of the present invention permits directly providing images having a high density, when irradiated with near infrared rays from a semiconductor laser, a strobo flash or the like. Since the underlayer of the optical recording medium regarding present invention contains the dispersible near infrared absorbent which is inexpensive but has not been used because of strong coloring properties and the near infrared absorbent which, for example, acts on the heat-sensitive color-developing layer to deteriorate a color density, many kinds of light sources can be utilized effectively which are, for example, the semiconductor laser having an optional near infrared wave length and the strobo flash having a continuous near infrared wave length. Therefore, the optical recording medium of the present case can attribute to putting the heat mode optical recording medium into practice.

What is claimed is:

1. An optical recording medium characterized in that an underlayer and a heat-sensitive color-developing layer are laminated in this order onto a base material, said underlayer containing a near infrared absorbent, said heat-sensitive color-developing layer containing a basic colorless dye and an organic developer.

2. An optical recording medium according to claim 1 wherein said near infrared absorbent is a dispersible near infrared absorbent which absorbs light having a wave length in a near infrared region of 0.7 to 2.5 μm.

3. An optical recording medium according to claim 2 wherein said dispersible near infrared absorbent is graphite, copper sulfide, lead sulfide, black titanium or tri-iron tetraoxide.

4. An optical recording medium according to claim 1 having a transparent protective layer on said heat-sensitive color-developing layer.

5. An optical recording medium according to claim 1 wherein a soluble near infrared absorbent is present in said underlayer or said transparent protective layer or is present on said protective layer.

6. An optical recording medium according to claim 1 wherein said underlayer in claim 1 contains a hollow pigment.

* * * * *